(12) United States Patent
Mally

(10) Patent No.: US 8,740,278 B1
(45) Date of Patent: Jun. 3, 2014

(54) SUSPENDED STORAGE SYSTEM FOR A VEHICLE GLOVE BOX

(71) Applicant: Nissan North America, Inc., Franklin, TN (US)

(72) Inventor: Thomas Mally, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/690,550

(22) Filed: Nov. 30, 2012

(51) Int. Cl.
*B60R 7/04* (2006.01)
*B60R 7/06* (2006.01)

(52) U.S. Cl.
CPC ........................ *B60R 7/06* (2013.01)
USPC ..................... 296/37.8; 296/37.12

(58) Field of Classification Search
USPC ............... 296/37.8–37.9, 37.12; 312/334.23, 312/334.26
See application file for complete search history.

(56) References Cited

U.S. PATENT DOCUMENTS

| | | | |
|---|---|---|---|
| 2,226,434 A | 12/1940 | Hirsh | |
| 2,601,685 A * | 7/1952 | Womack | 5/308 |
| 2,820,687 A | 1/1958 | Waring | |
| 3,694,048 A * | 9/1972 | Middleton | 312/246 |
| 4,811,981 A | 3/1989 | Benson | |
| 6,231,099 B1 | 5/2001 | Greenwald | |
| 7,407,212 B2 | 8/2008 | Kataoka et al. | |
| 7,926,861 B2 | 4/2011 | Merlo et al. | |
| 8,668,239 B2 * | 3/2014 | Doll | 296/37.12 |

FOREIGN PATENT DOCUMENTS

| | | | |
|---|---|---|---|
| DE | 4302948 | * | 8/1994 |
| JP | 1987210150 | | 9/1987 |
| JP | 1994166360 | | 6/1994 |
| JP | 2002036962 A | | 2/2002 |
| JP | 2002225635 A | | 8/2002 |
| JP | 2003-237477 | * | 8/2003 |
| JP | 2005271741 A | | 10/2005 |
| JP | 2008302887 A | | 12/2008 |

* cited by examiner

*Primary Examiner* — Dennis H Pedder
(74) *Attorney, Agent, or Firm* — Young, Basile, Hanlon & MacFarlane, P.C.

(57) ABSTRACT

Disclosed herein are embodiments of a storage structure for a passenger vehicle defining a passenger compartment. In one aspect, the storage structure comprises: a storage compartment configured for providing a storage space apart from the passenger compartment and defined at least in part by an overhead surface; a storage element positionable in the storage compartment; and a suspension assembly for suspending the storage element from the overhead surface, the assembly including a first portion on the overhead surface and a second portion connectable to the storage element and configured for selective mateable engagement with the first portion.

18 Claims, 13 Drawing Sheets

SUSPENDED STORAGE SYSTEM FOR A VEHICLE GLOVE BOX

TECHNICAL FIELD

The embodiments disclosed herein generally relate to the field of vehicle storage compartments, and in particular to a suspended storage system for vehicle storage compartments.

BACKGROUND

The front passenger compartment of a vehicle typically includes a dashboard forward of the front seats. The dashboard may include one or more storage compartments, such as a glove box, for example, that is accessible to a user of the vehicle from the front passenger compartment and configured for providing a space for storing items. Due to packaging or other limitations, it may not be practical or feasible to size and configure the storage compartment to have an abundance of storage capacity. In addition, it may be anticipated that certain items, such as an owner's manual, will be placed in the storage compartment permanently, using up valuable storage space and decreasing the overall usability of the storage compartment for the user of the vehicle. Consumers of the vehicle may therefore desire features that account for the need to store these items within the storage compartment in a manner that does not significantly impact the overall usability of the storage compartment with respect to other items.

SUMMARY

Disclosed herein are embodiments of a storage structure for a passenger vehicle defining a passenger compartment. In one aspect, the storage structure comprises: a storage compartment configured for providing a storage space apart from the passenger compartment and defined at least in part by an overhead surface; a storage element positionable in the storage compartment; and a suspension assembly for suspending the storage element from the overhead surface, the assembly including a first portion on the overhead surface and a second portion connectable to the storage element and configured for selective mateable engagement with the first portion.

In another aspect, a passenger vehicle comprises: a vehicle interior; a storage compartment accessible from the interior and defined at least in part by an overhead surface; and a suspension assembly for suspending a storage element positionable in the storage compartment from the overhead surface, the assembly including a first portion on the overhead surface and a second portion connectable to the storage element and configured for selective mateable engagement with the first portion.

In yet another aspect, a storage structure for a passenger vehicle defining a passenger compartment comprises: a storage compartment configured for providing a storage space apart from the passenger compartment and defined at least in part by an overhead surface; a storage element positionable in the storage compartment; and a suspension assembly for suspending the storage element from the overhead surface, the assembly including: a plurality of laterally spaced linear tracks extending along the overhead surface, and at least one projection connectable to the storage element and configured for selective mateable engagement with multiple of the plurality of tracks, wherein the projection is configured for selective engagement with at least a first of the plurality of tracks to suspend the storage element in a first position with respect to the overhead surface, and a second of the plurality of tracks to suspend the storage element in a second position with respect to the overhead surface, and wherein the projection is one of a linearly extending projection engageable with a respective track for translation along the track, and a head member engageable with a respective track for translation along the track and rotation within the track.

These and other aspects will be described in additional detail below.

BRIEF DESCRIPTION OF THE DRAWINGS

The various features, advantages and other uses of the present apparatus will become more apparent by referring to the following detailed description and drawings in which.

DETAILED DESCRIPTION

All references to "front," "forward," and the like, as well as references to "rear," "rearward," and the like herein are used with respect to a longitudinal direction of a vehicle. Specifically, "front," "forward," and the like refer to the front (fore) of the vehicle, while "rear," "rearward," and the like refer to the back (aft) of the vehicle.

Disclosed herein are embodiments of a storage structure for exemplary use in a passenger vehicle. The storage structure includes features for increasing the usable storage space within a storage compartment by providing for certain items to be suspended from an overhead surface of the storage compartment.

Figure 1:
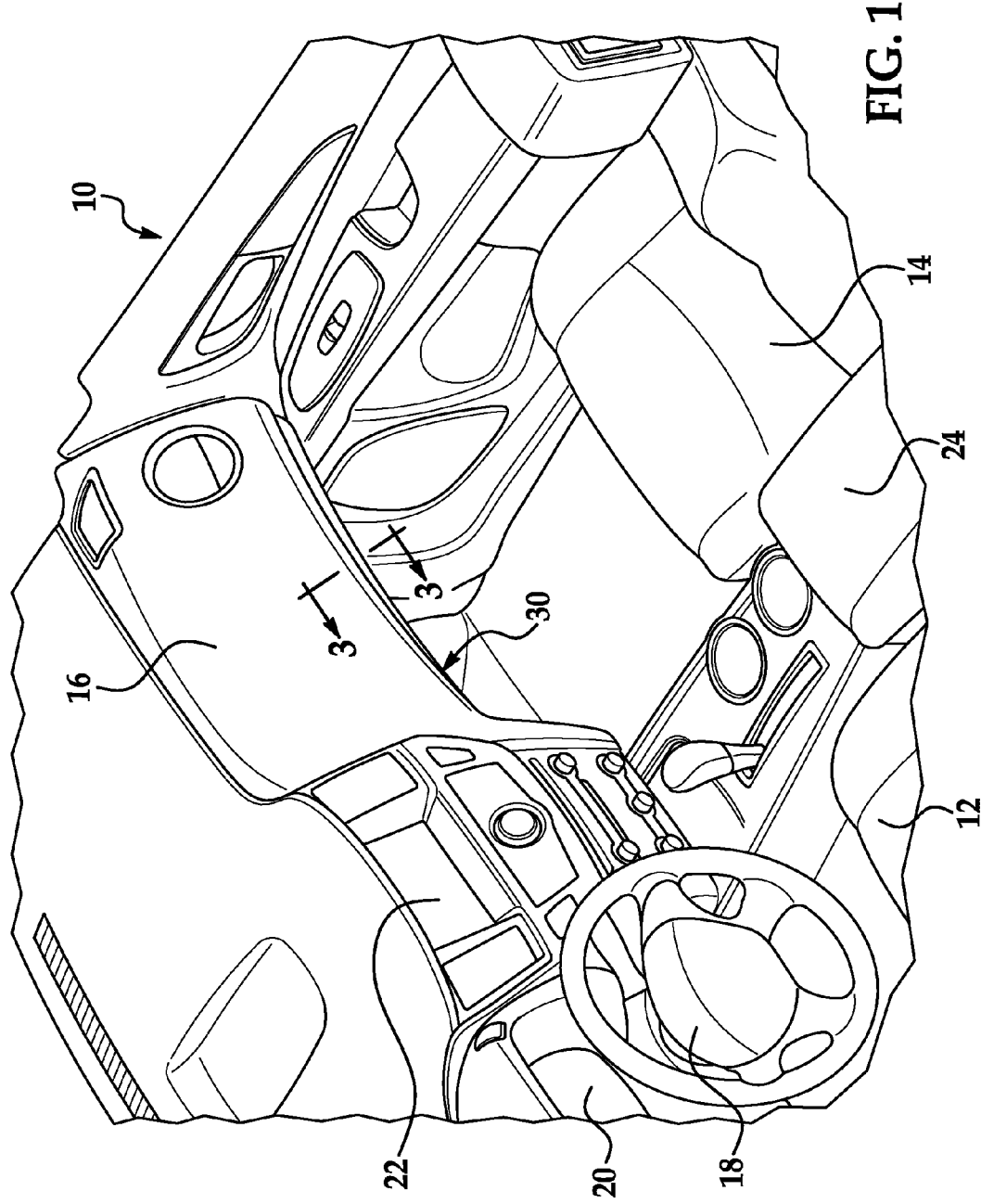
FIG. 1 is a perspective view of a vehicle passenger compartment showing a dash, a driver's seat and a front passenger seat.

An example of a front passenger compartment 10 of a vehicle interior is shown in FIG. 1. The front passenger compartment 10 includes a driver's seat 12 and a front passenger seat 14. A dash 16 extends transversely across the vehicle forward of the vehicle seats 12 and 14 and serves as a forward boundary for the front passenger compartment 10. A steering wheel 18 extends generally rearward from the dash 16 opposite the driver's seat 12. The dash 16 includes an instrument panel 20 opposite the driver's seat 12 and generally positioned above and forward of the steering wheel 18. A center stack 22 extends vertically along a midsection of the dash 16. The center stack 22 is oriented towards the vehicle seats 12 and 14 and is transversely disposed at a position generally between the driver's seat 12 and the front passenger seat 14. Opposite the center stack 22, a center console 24 is disposed between the driver's seat 12 and the front passenger seat 14.

The front passenger compartment 10 may include various structures in which a user of the vehicle can store items. For instance, the illustrated front passenger compartment 10 includes an exemplary storage structure 30, which is configured as a glove box assembly. With additional reference to FIG. 2, the storage structure 30 generally includes a storage compartment 32 for providing a storage space apart from the front passenger compartment 10, and an adjacent door 34 for selectively permitting access to the storage compartment 32 from the front passenger compartment 10.

The storage compartment 32 is provided with an access opening 36, which is in communication with the front passenger compartment 10 and accessible from a rear underside of the dash 16 opposite the front passenger seat 14. The door 34 is moveable between the illustrated closed position, where the door 34 is positioned to cover the access opening 36 with respect to the front passenger compartment 10, and an open position, where the door 34 is removed from the access opening 36 to expose the storage compartment 32. The door 34 can be hingedly coupled with respect to the dash 16 and/or storage compartment 32 for rearward and downward rotation about an axis adjacent a bottom portion of the access opening 36 and extending in the transverse direction of the vehicle. As shown, the door 34 can be configured with respect to the dash 16 and access opening 36 to sit substantially flush with the portions of the dash 16 that border the access opening 36, such that a continuous dash 16 surface is formed.

The storage structure 30, with the storage compartment 32 positioned within the dash 16 and accessible from the front passenger compartment 10, is presented in the non-limiting example as a glove box assembly. However, it will be understood that the features of the storage structure 30 described herein are applicable in principle to other vehicle storage compartments configured for providing a storage space apart from the front passenger compartment 10. For example, such storage compartments may include without limitation storage compartments positioned otherwise within the dash 16, or may include one or more storage compartments contained within the center console 24, for example. In addition, such storage compartments may be accessible from a rear cargo area, from a trunk or from an exterior of the vehicle, for example.

Figure 2:
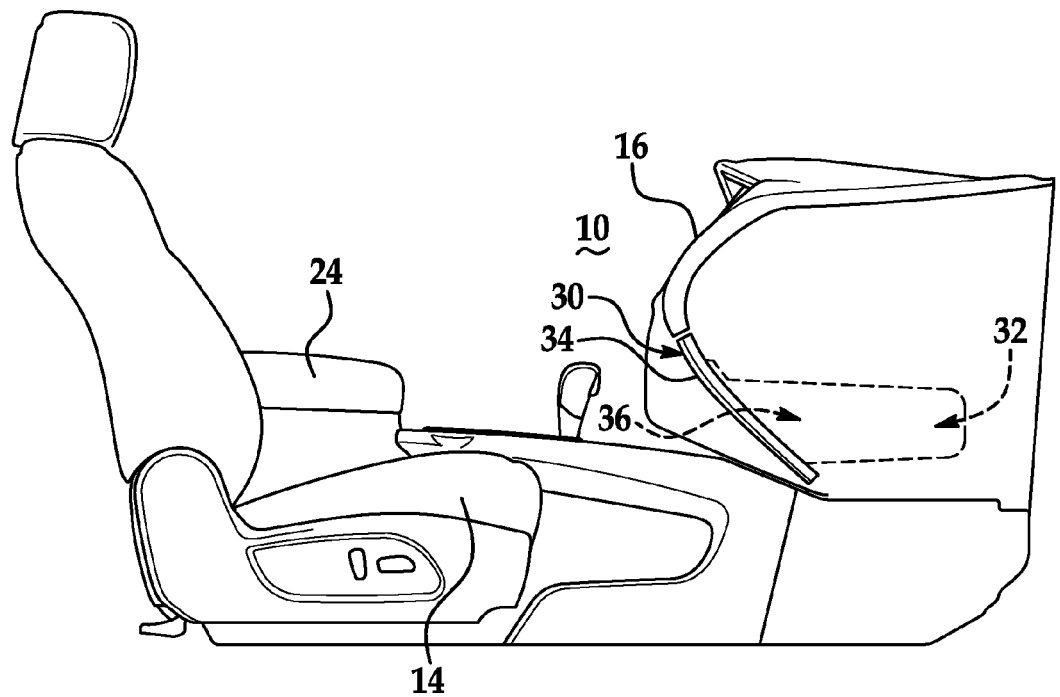
FIG. 2 is a side elevation view of the vehicle passenger compartment of FIG. 1 showing the front passenger seat and a storage compartment mounted within the dash.
Figure 3:
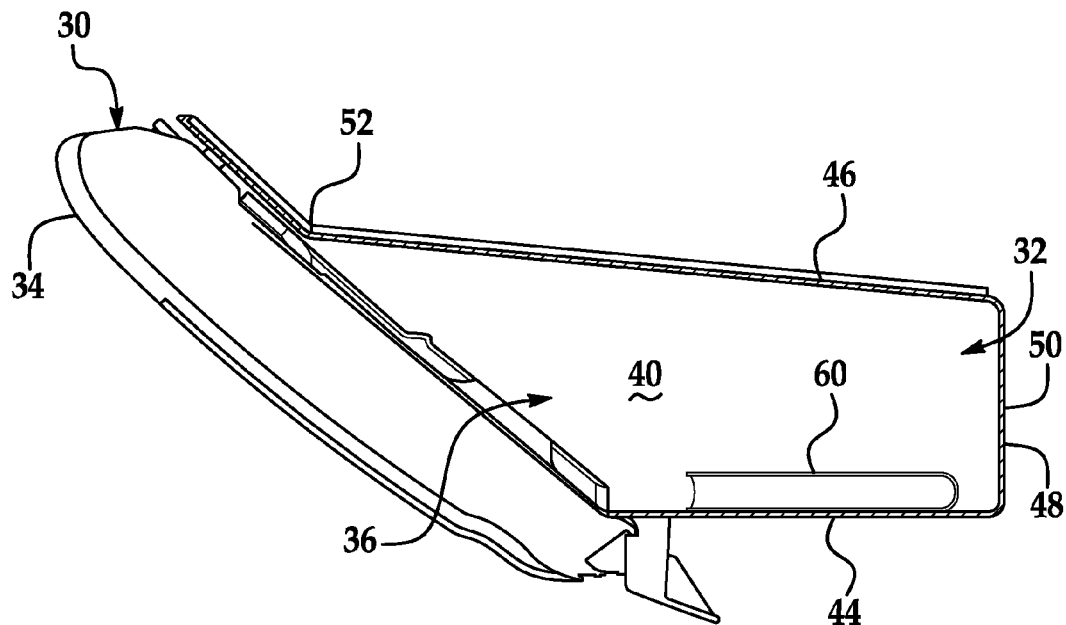
FIG. 3 is a side cross sectional view of the of the vehicle passenger compartment of FIG. 1 taken along the line 3-3 showing details of the storage compartment.
Figure 4:
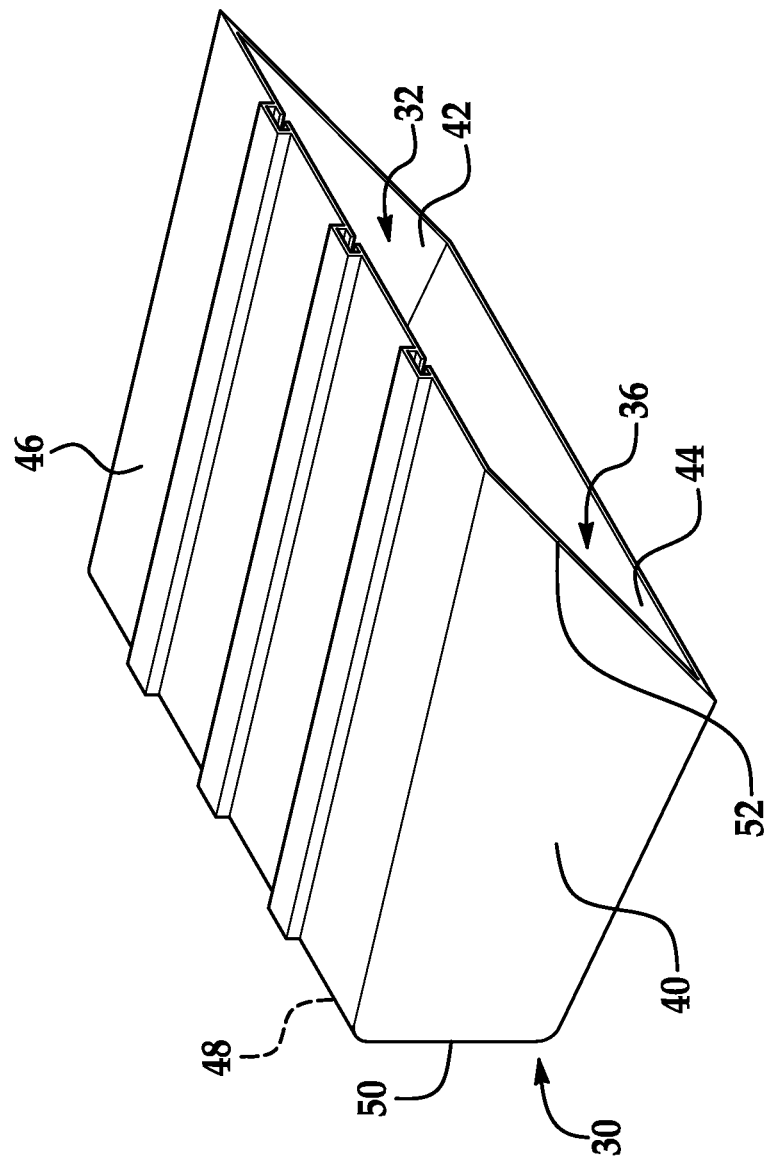
FIG. 4 is a perspective view of the storage compartment in isolation from the dash.

A cross section of the storage structure 30 of FIGS. 1 and 2 is shown in FIG. 3, while FIG. 4 shows the storage compartment 32 in isolation from the front passenger compartment 10. As shown in FIGS. 3 and 4, the storage compartment 32 is defined by a plurality of connected surfaces 40, 42, 44, 46 and 48 collectively forming an open ended storage container 50. A pair of transversely opposed upright side surfaces 40 and 42 (the side surface 42 is shown in FIG. 4) connect between the respective transverse ends of a generally horizontally disposed lower surface 44 and an opposing generally horizontally disposed overhead surface 46, as shown. An upright front surface 48 is positioned normally to the side surface 40, the side surface 42, the lower surface 44 and the overhead surface 46 to close off their respective forward peripheral edges and define a forward boundary for the storage compartment 32. The side surface 40, the side surface 42, the lower surface 44 and the overhead surface 46 terminate in a rearward direction to form a continuous rearward edge 52 of the storage container 50, such that an open end of the storage container 50 defines the access opening 36 for the storage compartment 32. Although the surfaces 40, 42, 44, 46 and 48 are illustrated as substantially planar and forming a box-like storage container 50, any arrangement or combination of planar or non-planar surfaces could be used to form the storage container 50 and define the storage compartment 32 in a manner suitable for providing storage to a user of the vehicle.

The lower surface 44 generally provides a base for supporting an item 60 placed within the storage compartment 32. The item 60 is shown generally as a user's manual for the vehicle, which is provided as a non-limiting example of a staple item that, as a matter of common practice or user preference, typically is expected to remain stored within the storage compartment 32 for future availability. Although the item 60 may not frequently be used, it can be seen that its presence within a lower, main storage area of the storage compartment 32 acts as a limitation on the usable storage space within the storage compartment 32 available for other items.

It is known to provide fixed means in the storage container 50, for instance an upper shelf disposed between the lower surface 44 and the overhead surface 46, for storing the item 60 away from the main storage area of the storage compartment 32. However, it may not be practical or feasible during design of the vehicle to provide an upper shelf. Even where it is possible to provide an upper shelf, the space allocated for storage of the item 60 must be fixed to accommodate all of the anticipated items 60 for which the upper shelf is provided. With respect to the illustrated owner's manual, for example, even vehicles of the same make and model may have different sized owner's manuals due to differences in equipment or options. This may lead to inefficiencies with respect to the storage of certain owner's manuals in the storage compartment 32 on the upper shelf. In addition, the space allocated by the upper shelf for storage of the item 60 may not be accommodating to other items 60 not anticipated during design of the vehicle. For example, the space may be too small, too large, and/or inefficiently shaped with respect to the items 60.

As described in further detail below, the storage structure 30 disclosed herein includes features that account for the need to store both anticipated and unanticipated items 60 within the storage compartment 32, while reducing a corresponding adverse impact on the overall usability of the storage compartment 32 with respect to other items. Specifically, the storage structure 30 is configured with features permitting the illustrated item 60 or a wide variety of other items 60 to be suspended in close proximity from the overhead surface 46 defining the storage compartment 32. Although the storage structure 30 is described with general reference to the above described considerations, it will be understood that the storage structure 30 described herein may have many other advantageous characteristics, e.g., re-configurability, that can but need not be specifically related to these or similar considerations.

Figure 5:
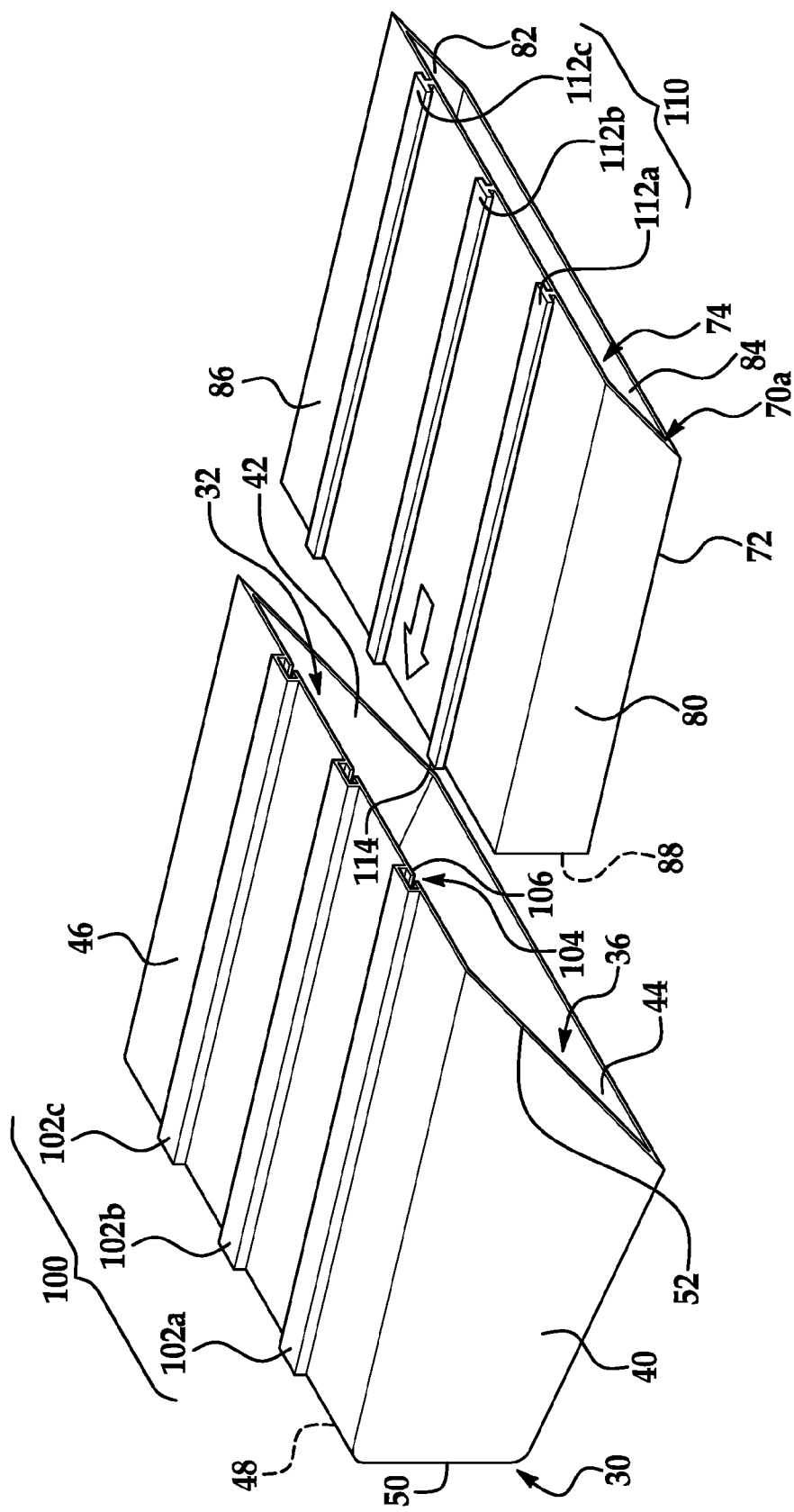
FIG. 5 is a perspective view of a storage structure incorporating the storage compartment as shown in FIG. 4 and a first example of a storage element.
Figure 6:
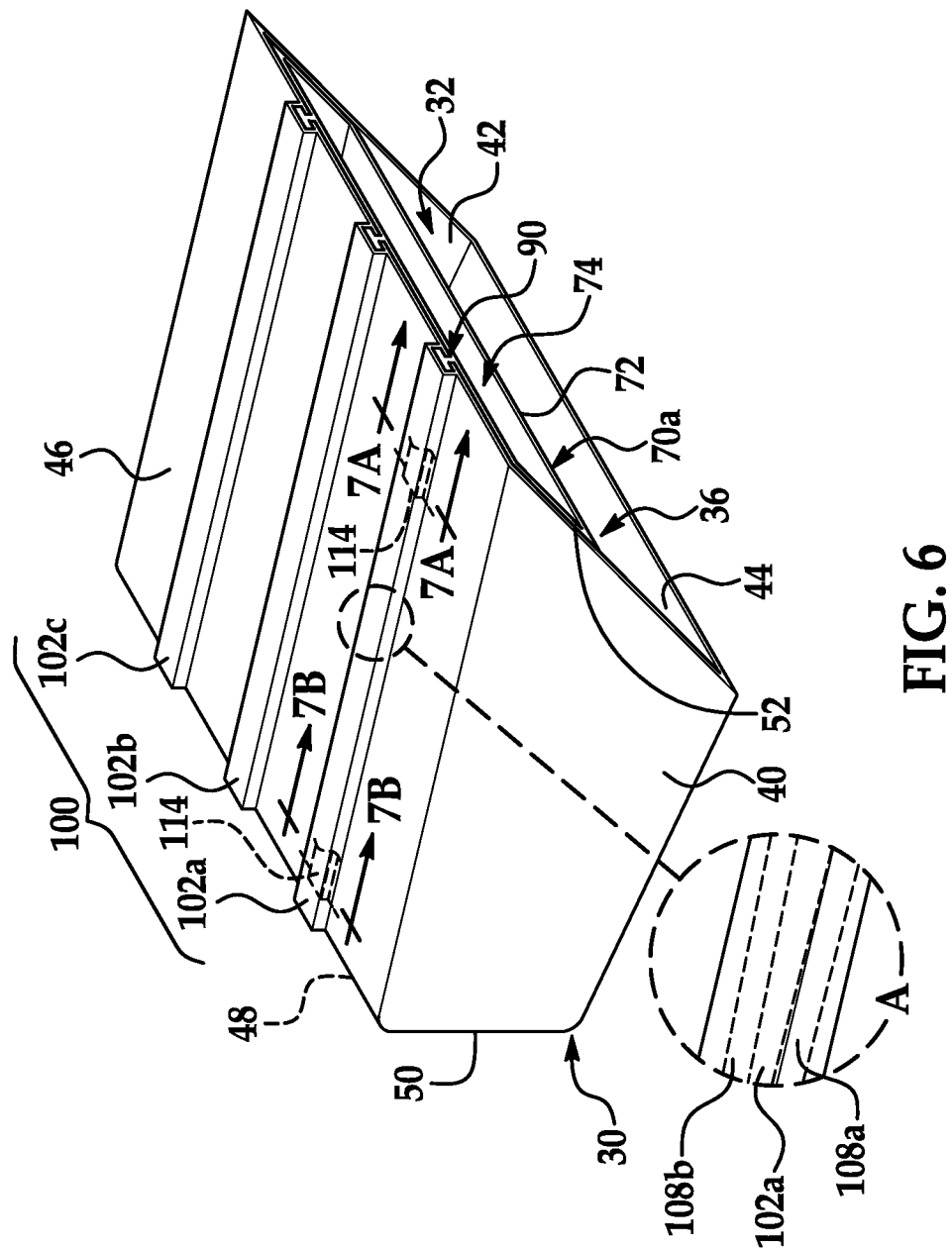
FIG. 6 is a perspective view of the storage structure of FIG. 5 with the storage element suspended from an overhead surface of the storage compartment.

As shown in FIGS. 5 and 6, the storage structure 30 includes the storage container 50 defining the storage compartment 32, as described above, as well as a first example of a storage element 70a positionable within the storage compartment 32. The storage element 70a is sized and configured for selective positioning within the storage compartment 32 adjacent to the upper surface 46. As shown, the storage element 70a may be inserted from the front passenger compartment 10 into the storage compartment 32 through the access opening 36.

The storage element 70a of the first example is a tray 72 generally constructed similarly to the storage container 50 to define a receptacle 74 for receiving and storing the item 60. Specifically, the receptacle 74 is defined by a plurality of connected surfaces 80, 82, 84, 86 and 88 collectively forming the tray 72. When oriented for positioning within the storage compartment 32, the tray 72 includes a pair of transversely opposed upright side surfaces 80 and 82 that connect between the respective transverse ends of a generally horizontally disposed lower surface 84 and an opposing generally horizontally disposed upper surface 86, as shown. Optionally, an upright front surface 88 is positioned normally to the side surface 80, the side surface 82, the lower surface 84 and the upper surface 86 to close off their respective forward peripheral edges and define a forward boundary for the receptacle 74. The side surface 80, the side surface 82, the lower surface 84 and the upper surface 86 may freely terminate in a rearward direction such that the tray 82 is open ended for access from the front passenger compartment 10 when the tray 72 is positioned within the storage compartment 32, as shown in FIG. 6. In the illustrated example of the tray 72, the transversely opposed upright side surfaces 80 and 82 are spaced such that the lower surface 84 extends substantially a full width of the storage container 50 between the opposed upright side surfaces 40 and 42. However, and as shown and described below in other examples, alternative configurations for the tray 72 are possible.

When the tray 72 is positioned within the storage compartment 32 adjacent to the upper surface 46, the lower surface 84 of the tray 72 is disposed above the lower surface 44 of the storage container 50, and provides a base for supporting the item 60 away from a lower, main storage area of the storage compartment 32. It can be seen that the storage structure 30, with the tray 72 positioned within the storage compartment 32 adjacent to the upper surface 46 and defining a receptacle 74 sized to store the item 60, approximates the storage capability of a storage container 50 with a fixed upper shelf disposed between the lower surface 44 and the overhead surface 46.

However, it can be seen that the tray 72 provides much greater packaging flexibility for the storage compartment 32 than such an upper shelf. For instance, the tray 72 can be removed from the storage compartment 32 to create additional storage space, if desired. In addition, the tray 72 can be sized and configured to allocate only the necessary space via the receptacle 74 for storage of a particular item 60. For example, different trays 72 can be configured to accommodate respective differently sized owner's manuals for cars across multiple model years or vehicle platforms that each include the same storage container 50, which increases parts commonization opportunities and thus reduces expenses.

In the illustrated storage structure 30, a suspension assembly 90 is configured for suspending the storage element 70a from the overhead surface 46 of the storage container 50. The suspension assembly 90 generally includes a first portion 100 on the overhead surface 46 of the storage container 50, and a second portion 110 connectable to the storage element 70a and configured for selective mateable engagement with the first portion 100.

As shown, the first portion 100 of the suspension assembly 90 comprises one or more transversely spaced tracks 102a, 102b and 102c extending in parallel along the overhead surface 46 in a longitudinal direction. Although three transversely spaced and longitudinally extending parallel tracks 102a, 102b and 102c are illustrated as a non-limiting example, it will be understood that the tracks 102 can be provided in alternate numbers and/or in alternate orientations with respect to the overhead surface 46.

The second portion 110 of the suspension assembly 90 comprises one or more laterally spaced projections 112 individually configured for selective mateable engagement with at least one or more of the tracks 102a, 102b and 102c on the overhead surface 46 of the storage compartment 32. The projections 112 can be integrally connected with the tray 72, for example, but may alternatively be configured for selective connection to the tray 72. The projections 112a, 112b and 112c are generally configured for slidable engagement with a respective track 102a, 102b and 102c, such that the tray 72 can be slid into the storage compartment 32 and suspended from the overhead surface 46.

With representative reference to the track 102a, the tracks 102a, 102b and 102c are generally configured as C-shaped members defining a female channel 104. The channel 104 has a receiving end 106 open to and in communication with the front passenger compartment 10 at the rearward edge 52 of the storage container 50. The cross section of the C-shaped member forming the track 102a is continued along the length of the track 102a to define a generally continuous female channel 104 that defines a path of travel for a projection 112a, 112b or 112c along the track 102a at the overhead surface 46. As the tray 72 is positioned from the front passenger compartment 10 into the storage compartment 32, a leading edge 114 of a representative male projection 112a, which has a T-shaped cross section generally corresponding in shape with the channel 104 defined by the track 102a, can be inserted into the channel 104 at the receiving end 106 to place the projection 112a into mateable engagement with the track 102a.

According to the illustrated first example of a storage element 70a, i.e., the tray 72, three projections 112a, 112b and 112c project from the upper surface 86 of the tray 72, and the T-shaped cross sections of the projections 112a, 112b and 112c are continued along at least a partial length of the projections 112a, 112b and 112c. The projections 112a, 112b and 112c extend in parallel along the upper surface 86 in a longitudinal direction with a transverse spacing corresponding to the transverse spacing of the tracks 102a, 102b and 102c, such that, simultaneously, the projection 112a may be placed into mateable engagement with the track 102a, the projection 112b may be placed into mateable engagement with the track 102b, and the projection 112c may be placed into mateable engagement with the track 102c. It can be seen that the mateable engagement in the first example is generally permissive of translation of the projections 112a, 112b and 112c along the respective tracks 102a, 102b and 102c, while restrictive of downward and rotational movement of the projections 112a, 112b and 112c with respect to the respective tracks 102a, 102b and 102c. As with the tracks 102a, 102b and 102c, it will be understood that the three transversely spaced and longitudinally extending parallel projections 112a, 112b and 112c are illustrated as a non-limiting example, and that the projections 112 can be provided in alternate numbers and/or orientations with respect to the tray 72.

The suspension assembly 90 may optionally include features for securing the second portion 110 with respect to the first portion 100 in order to inhibit free movement of the tray 72 with respect to the overhead surface 46. As shown in the detail A in FIG. 6 of the representative track 102a, opposing walls 108a and 108b defining the channel 104 are configured such that a clearance between the channel 104 of the track 102a and the projection 112a generally decreases as the projection 112a becomes further received within the channel 104. Specifically, in the illustrated non-limiting example, the representative projection 112a is substantially uniform in size and shape along its longitudinal direction, while the walls 108a and 108b are configured to progressively taper toward each other from the receiving end 106 of the channel 104 to positions further along the channel 104 within the track 102a (as shown, a degree of the taper is exaggerated for ease of understanding).

Figure 7A:
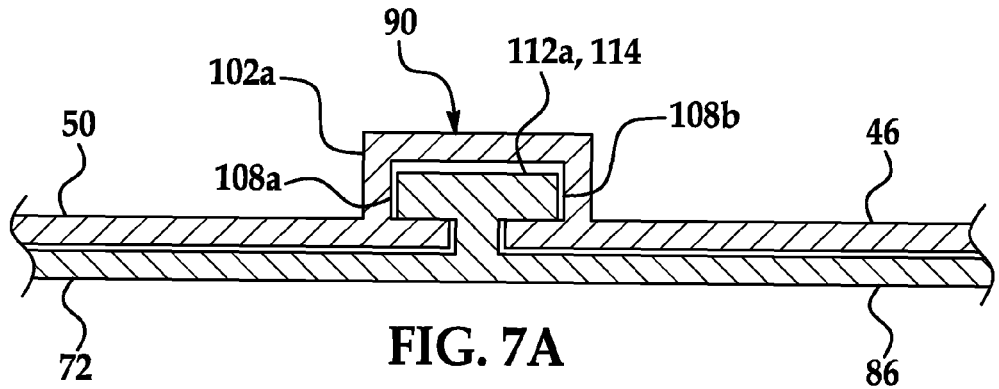
FIGS. 7A and 7B are cross sections of the storage structure as shown in FIG. 6 taken along the lines 7A-7A and 7B-7B, respectively, showing features of an engagement between a track on the overhead surface and a projection connected to the storage element.
Figure 7B:
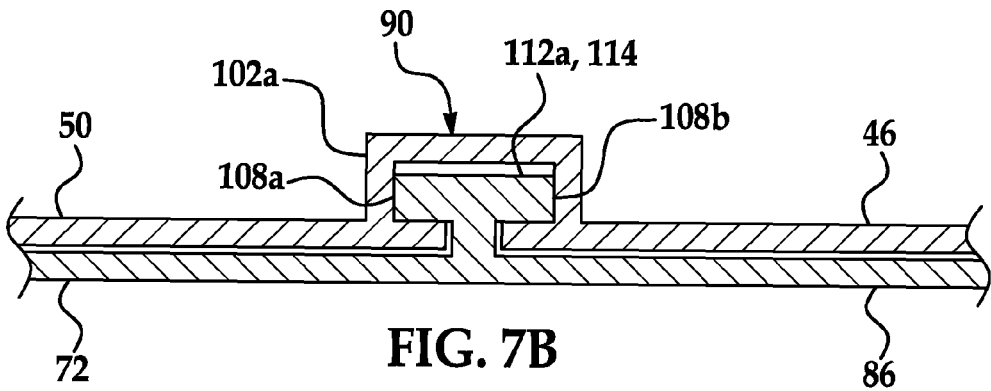

As shown with additional reference to FIGS. 7A and 7B, the clearance between the channel 104 of the track 102a and the projection 112a generally decreases as the leading edge 114 of the projection 112a is positioned from a first position with respect to the track 102a, adjacent the receiving end 106 of the channel 104, to a second position further along the track 102a from the receiving end 106 than the first position. As the tray 72 is slid into the storage compartment 32, as described above, pressure can be applied to the tray 72 to forcibly position the leading edge 114 of the projection 112a within the channel 104 to the second position with respect to the track 102a. As shown in FIG. 7B, following forcible positioning of the leading edge 114 of the projection 112a within the channel 104 from the first position to the second position, the projection 112a is substantially pressure fit into the channel 104, and movement of the leading edge 114 of the projection 112a towards the first position is inhibited. Although specific configurations of the track 102a and the projection 112a are shown and described, it will be understood that many variations in the sizes, shapes and/or configurations of the representative track 102a, projection 112a or both are possible to achieve a reduction in clearance between the channel 104 of the track 102a and one or more portions of the projection 112a at various of the possible positions of the projection 112a with respect to the track 102a.

The tray 72, with three projections 112a, 112b and 112c projecting from the upper surface 86 of the tray 72 for respective engagement with the three transversely spaced tracks 102a, 102b and 102c of the overhead surface 46 of the storage container 50, is provided as a first non-limiting example 70a of a storage element. Considerable alternatives are possible with respect to the number of tracks 102a, 102b,102c, etc., the number of projections 112a, 112b,112c, etc., and the combinations by which one or more projections 112a, 112b,112c, etc., can be placed into mateable engagement with one or more tracks 102a, 102b,102c, etc. Further, it will be understood that alternative configurations for the tracks 102a, 102b, 102c, etc., and/or the projections 112a, 112b, 112c, etc., are possible. Such alternatives may permit the storage element to be suspended from the overhead surface 46 at multiple positions and/or orientations, for example.

Figure 8:
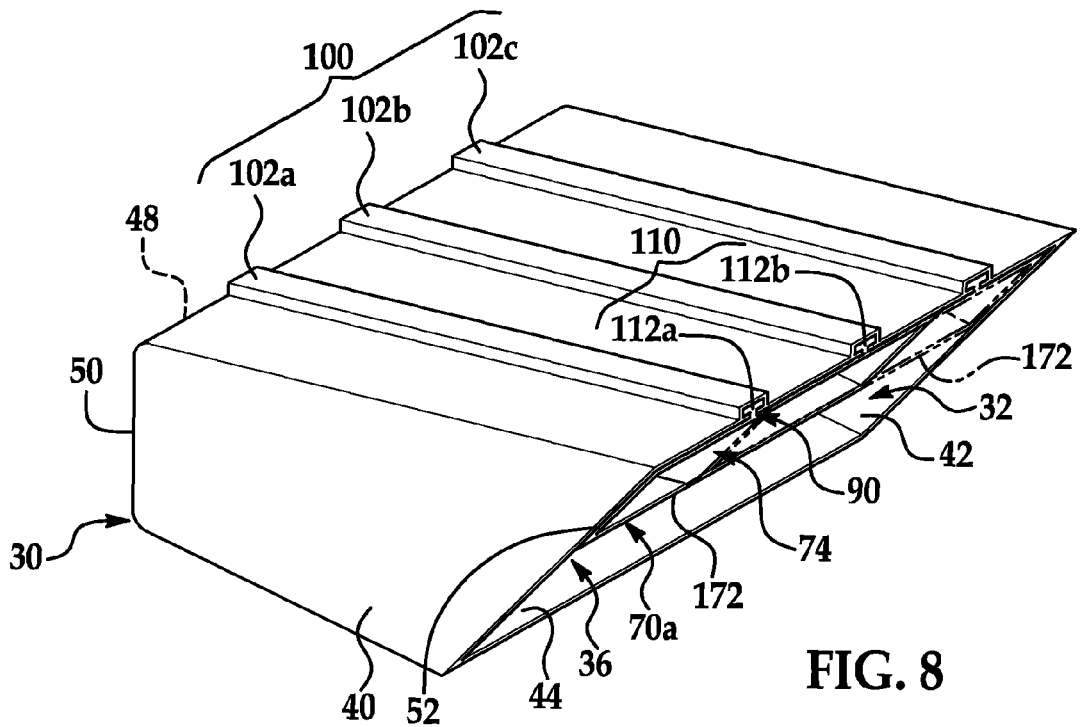
FIG. 8 is a perspective view of a storage structure incorporating the storage compartment as shown in FIG. 4 and a second example of a storage element suspended in multiple positions from the overhead surface of the storage compartment.

A second example of a storage element 70b positionable within the storage compartment 32 is shown in FIG. 8. The storage element 70b of the second example is a tray 172 generally constructed similarly to the tray 72 to define the receptacle 74 for receiving and storing the item 60. With reference still to FIG. 6, it can be seen that the tray 172 may be configured so that the transversely opposed upright side surfaces 80 and 82 are spaced such that the lower surface 84 extends less than a full width of the storage container 50 between the opposed upright side surfaces 40 and 42.

As shown, the first portion 100 of the suspension assembly 90 comprises the three transversely spaced tracks 102a, 102b and 102c extending in parallel along the overhead surface 46 in a longitudinal direction, as described above, although the tracks 102 can be provided in alternate numbers and/or in alternate orientations with respect to the overhead surface 46. According to the illustrated second example of a storage element 70b, i.e., the tray 172, the second portion 110 of the suspension assembly 90 comprises a pair of laterally spaced projections 112a and 112b. The pair of laterally spaced projections 112a and 112b are configured for respective slidable engagement with a first pair of tracks 102a and 102b of the tracks 102a, 102b and 102c, as well as for respective slidable engagement with a second pair of tracks 102b and 102c of the tracks 102a, 102b and 102c, such that the tray 172 can be slid into the storage compartment 32 and suspended from the overhead surface 46 in two different positions, as shown.

Figure 9:
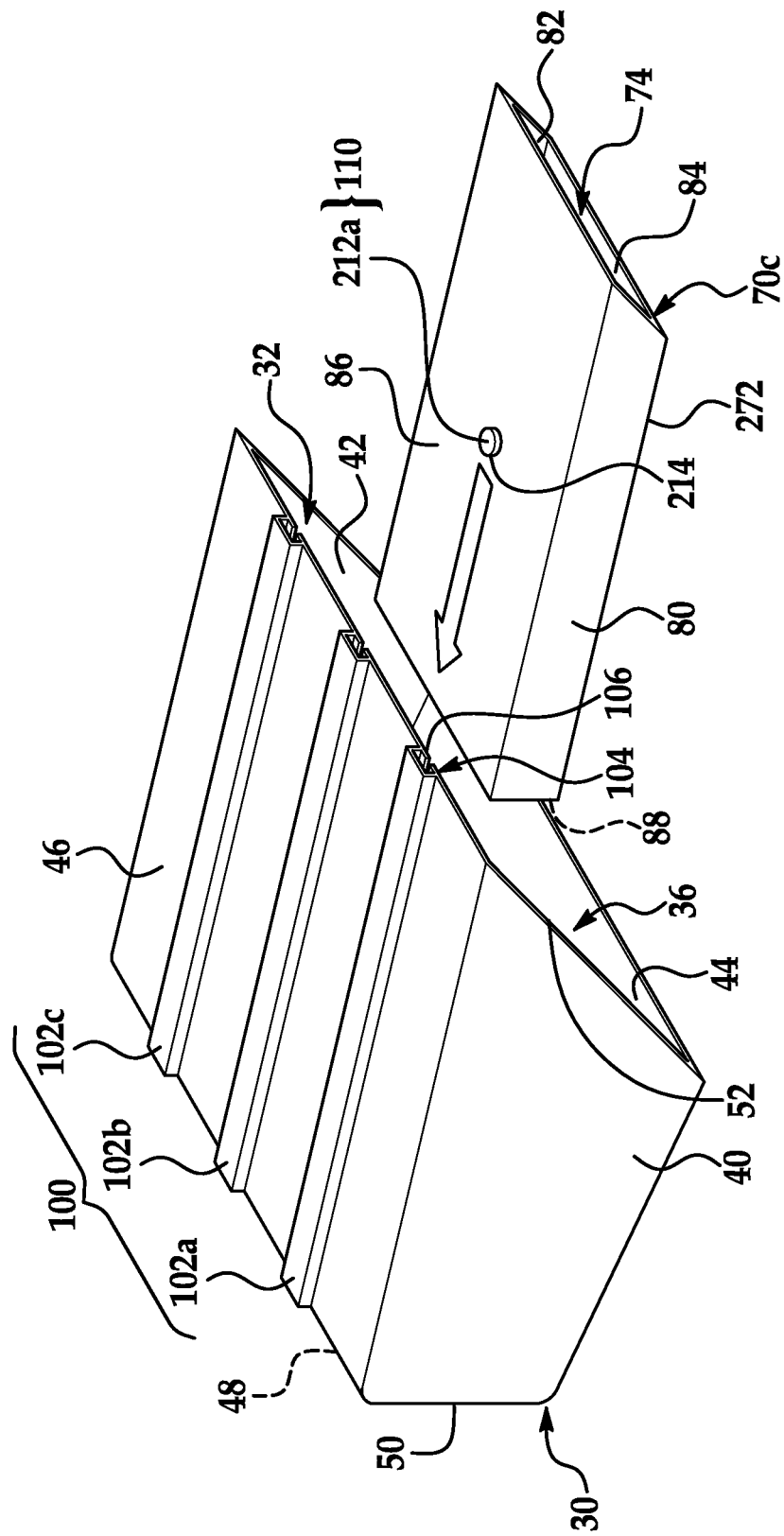
FIG. 9 is a perspective view of a storage structure incorporating the storage compartment as shown in FIG. 4 and a third example of a storage element.

A third example of a storage element 70c positionable within the storage compartment 32 is shown in FIG. 9. The storage element 70c of the third example is a tray 272 generally constructed similarly to the tray 172 to define the receptacle 74 for receiving and storing the item 60. As shown, the first portion 100 of the suspension assembly 90 comprises the three transversely spaced tracks 102a, 102b and 102c extending in parallel along the overhead surface 46 in a longitudinal direction, as described above, although the tracks 102 can be provided in alternate numbers and/or in alternate orientations with respect to the overhead surface 46.

According to the illustrated third example of a storage element 70c, i.e., the tray 272, the second portion 110 of the suspension assembly 90 comprises a projection 212a configured for selective mateable and slidable engagement with each of the tracks 102a, 102b and 102c on the overhead surface 46 of the storage compartment 32. Similarly to the representative projection 112a described above, the projection 212a has a T-shaped cross section generally corresponding in shape with the channels 104 defined by a representative track 102a, and can be inserted into the channel 104 at the receiving end 106 to place the projection 212a into mateable engagement with the track 102a. However, the projection 212a is a head member with a circular profile generally configured for single point contact with each of the opposing walls 108a and 108b defining the channel 104. Therefore, it can be seen that the mateable engagement between the projection 212a and any one of the tracks 102a, 102b and 102c is generally permissive of translation of the projection 212a along the respective tracks 102a, 102b and 102c, as well as of rotation of the projection 212a within the respective tracks 102a, 102b and 102c, while restrictive of downward movement of the projection 212a with respect to the respective tracks 102a, 102b and 102c.

Figure 10A:
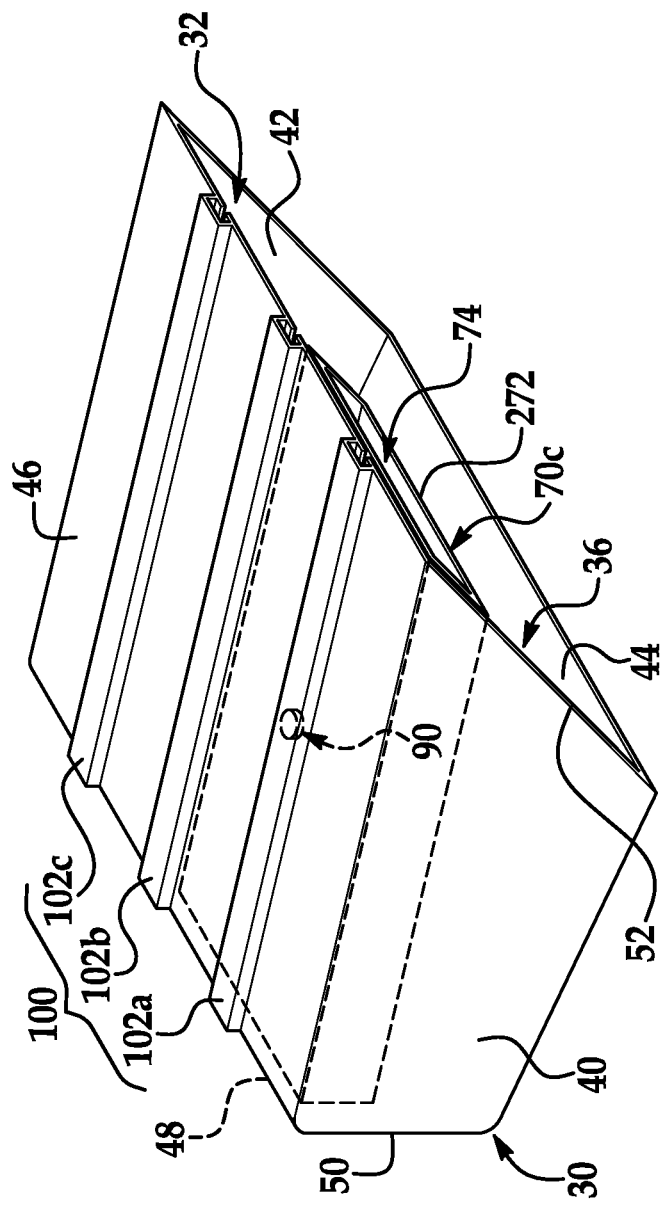
FIGS. 10A-10D are perspective views of the storage structure of FIG. 9 with the storage element suspended in multiple positions and orientations from the overhead surface of the storage compartment.
Figure 10B:
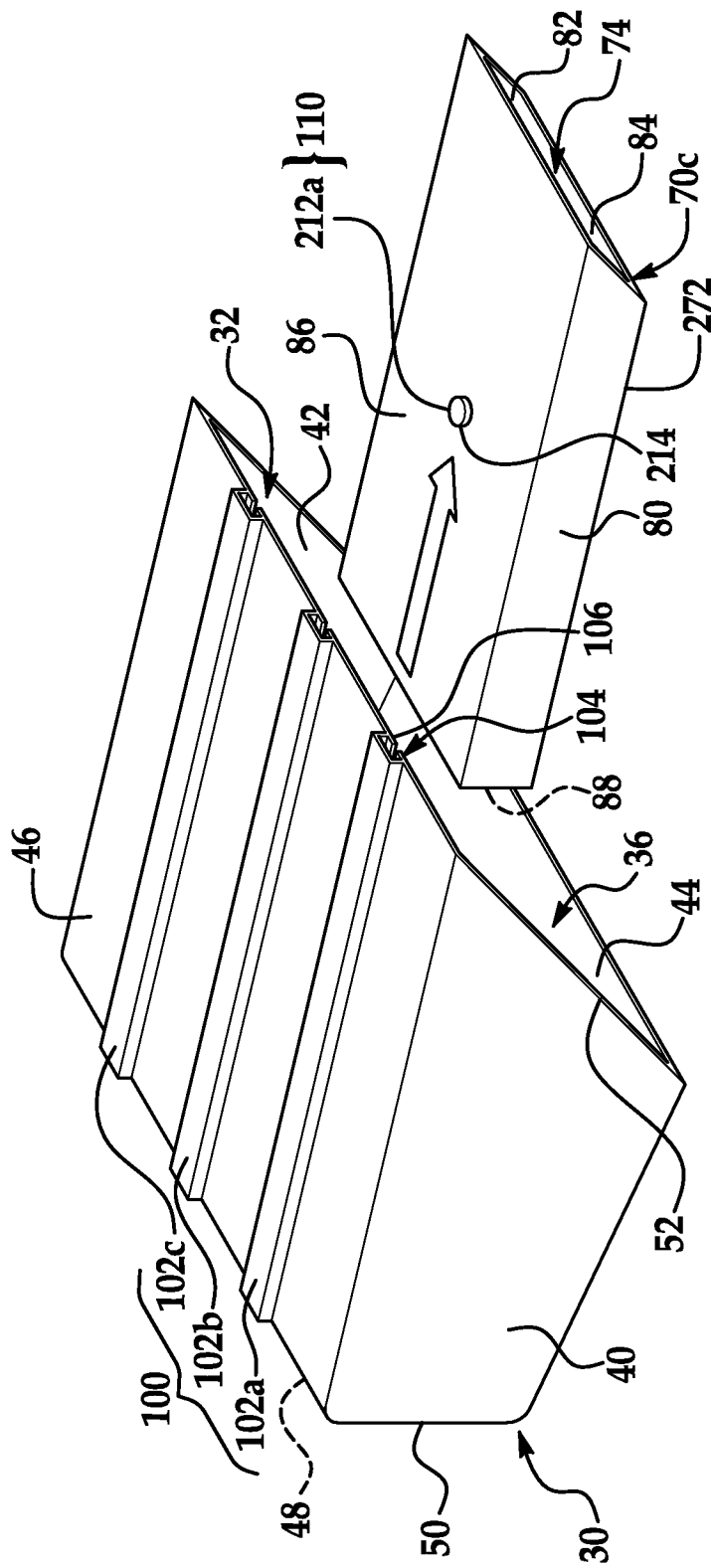
Figure 10C:
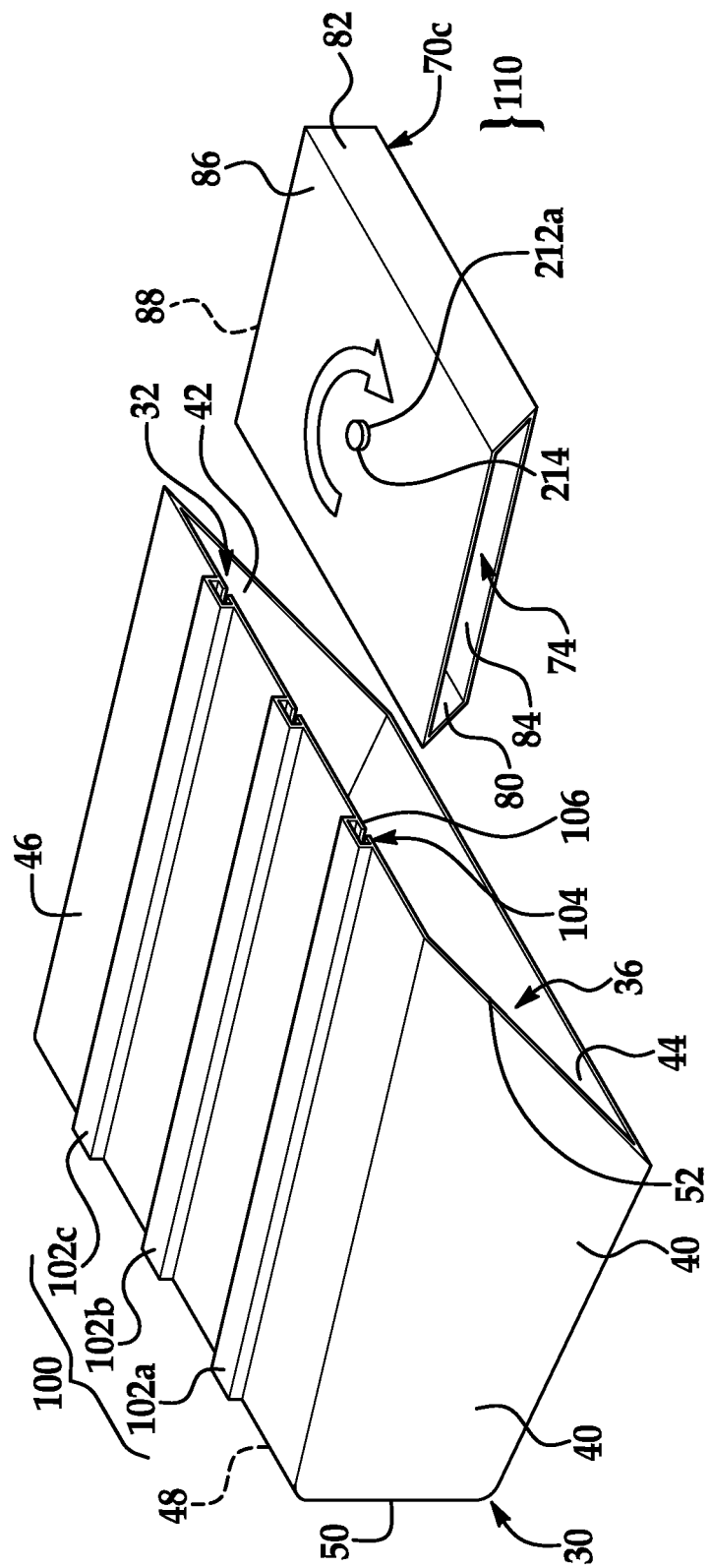
Figure 10D:
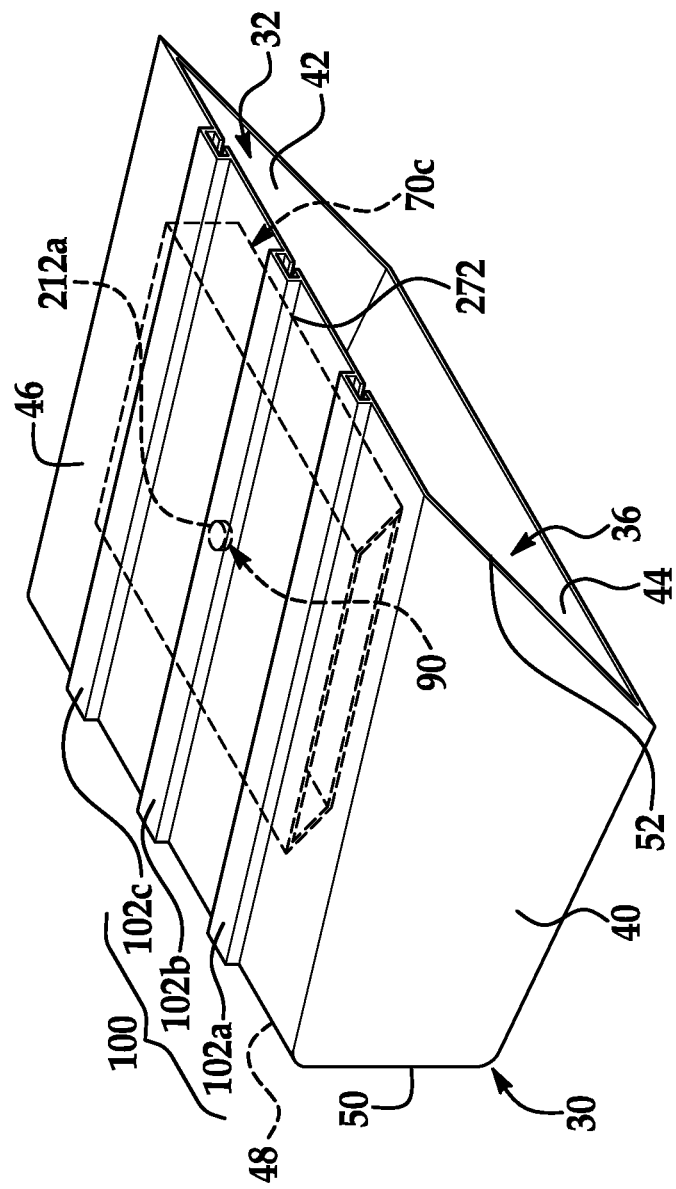

The tray 272 may be suspended from the overhead surface 46 at multiple positions with respect to the transverse and/or longitudinal directions of the storage compartment 32, as well as in multiple orientations, for example, to provide substantial packaging flexibility for the storage compartment 32. For instance, as shown in FIG. 10A, the tray 272 is longitudinally oriented, with the projection 212a in mateable engagement with the track 102a, to suspend the tray 272 from the overhead surface 46 of the storage container 50 adjacent the upright side surface 40. In FIG. 10B, the tray 272 is removed from the storage compartment 30, and in FIG. 10C, the tray 272 is reoriented to a transverse orientation. As shown in FIG. 10D, the tray 272 can be repositioned with the projection 212a in mateable engagement with the track 102b, to suspend the tray 272 from the overhead surface 46 of the storage container 50 between the upright side surfaces 40 and 42. In addition, while transversely oriented, the tray 272 may optionally be repositioned by sliding the tray 272 in a rearward or forward direction. Although the above description is provided as a non-limiting example, it will be understood that the tray 272 may be suspended from the overhead surface 46 at any position and/or orientation permitted by the relative size, shapes and configurations of the storage compartment 32 and the tray 272.

The trays 72, 172 and 272 may be rigid structures, for example, or can be flexible pouch-like structures made of fabric or other suitable materials. In addition, while the trays 72, 172 and 272 are generally shown as open ended to permit access to the receptacle 74, the trays 72, 172 and 272 could alternatively be closed depending upon the characteristics of the item 60 to be stored within the receptacle 74, for example.

Figure 11:
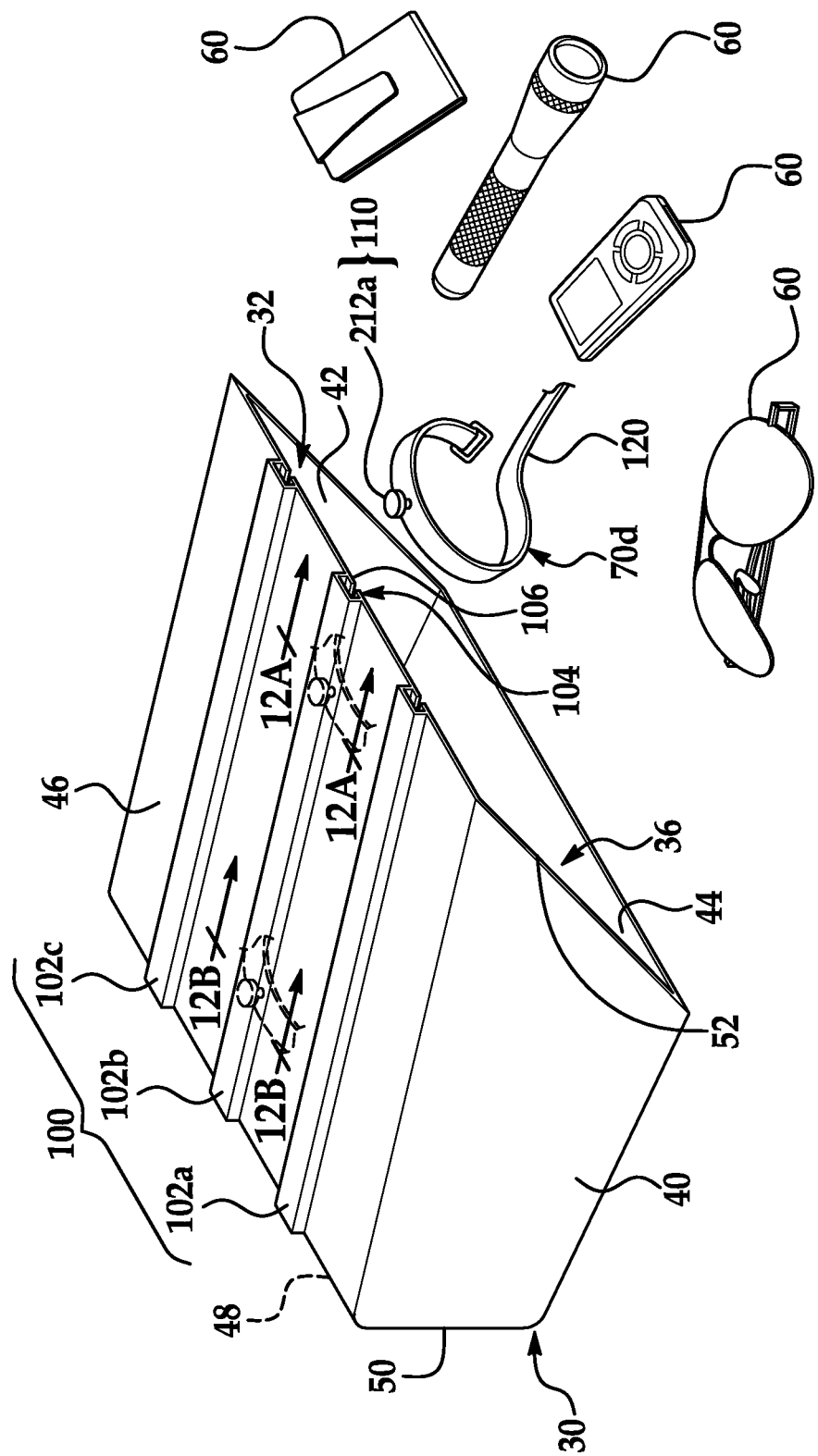
FIG. 11 is a perspective view of a storage structure incorporating the storage compartment as shown in FIG. 4 and a fourth example of a storage element.

A fourth example of a storage element 70d positionable within the storage compartment 32 is shown in FIG. 11. The storage element 70d of the fourth example is generally configured as an adjustable strap 120 capable of receiving multiple different sized and shaped items 60 (e.g., sunglasses, an .mp3 player, a flashlight and a money clip are shown as non-limiting examples) and suspending the items 60 from the overhead surface 46 of the storage container 50. The strap 120 may have advantageous use, for example, in accounting for the need to store unanticipated items 60 within the storage compartment 32.

As shown, the first portion 100 of the suspension assembly 90 comprises the three transversely spaced tracks 102a, 102b and 102c extending in parallel along the overhead surface 46 in a longitudinal direction, as described above, although the tracks 102 can be provided in alternate numbers and/or in alternate orientations with respect to the overhead surface 46. According to the illustrated fourth example of a storage element 70d, the second portion 110 of the suspension assembly 90 comprises the projection 212a configured for selective mateable and slidable engagement with each of the tracks 102a, 102b and 102c on the overhead surface 46 of the storage compartment 32.

As explained above, the mateable engagement between the projection 212a and any one of the tracks 102a, 102b and 102c is generally permissive of translation of the projection 212a along the respective tracks 102a, 102b and 102c, as well as of rotation of the projection 212a within the respective tracks 102a, 102b and 102c, such that an item 60 can be suspended from the overhead surface 46 with the strap 120 at any position and/or orientation permitted by the relative sizes, shapes and configurations of the storage compartment 32 and the item 60.

The projection 212a can be integrally connected with the strap 120, for example, but may alternatively be configured for selective connection to the strap 120. Alternatively, the projection 212a could be provided individually and configured to permit connection by a user of the vehicle to the strap 120, or to other storage elements according the user's preference.

The projection 212a is shown in FIG. 11 at multiple positions along the track 102b. It will be understood that the track 102b (and 102c) may be similarly configured to the representative track 102a such that, as described above with reference to the detail A in FIG. 6, opposing walls 108a and 108b defining a channel 104 of the track 102b are configured such that a clearance between the channel 104 and the projection 212a generally decreases as the projection 212a becomes further received within the channel 104.

Figure 12A:
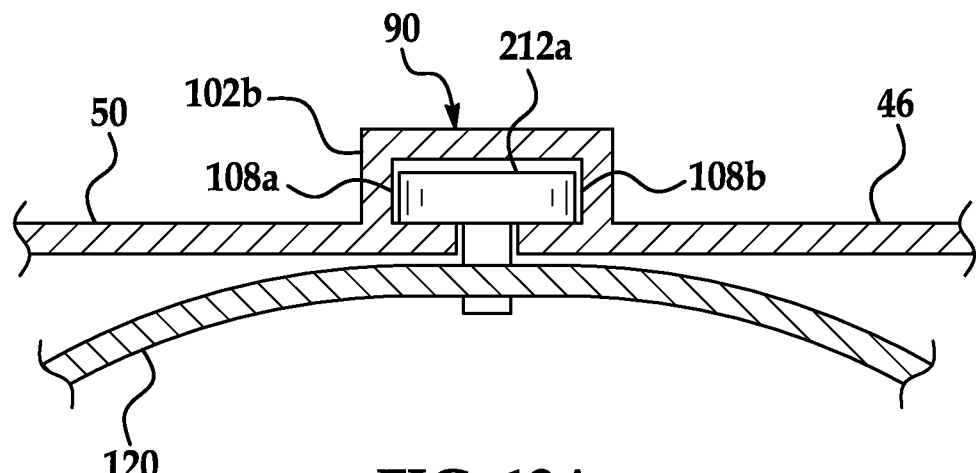
FIGS. 12A and 12B are cross sections of the storage structure as shown in FIG. 11 taken along the lines 12A-12A and 12B-12B, respectively, showing features of an engagement between a track on the overhead surface and a projection connected to the storage element.
Figure 12B:
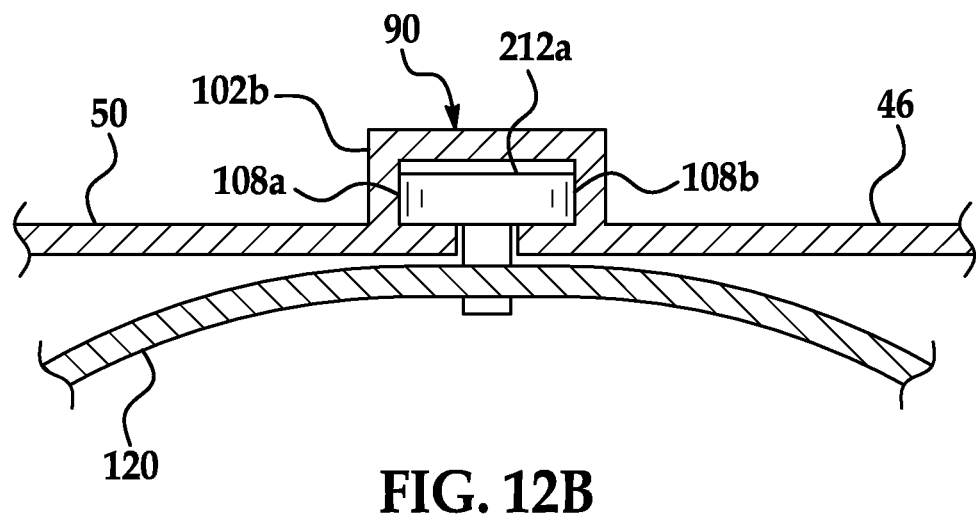

As shown with additional reference to FIGS. 12A and 12B, the clearance between the channel 104 of the track 102b and the projection 212a generally decreases as the projection 212a is positioned from a first position with respect to the track 102b, adjacent the receiving end 106 of the channel 104, to a second position further along the track 102b from the receiving end 106 than the first position. As the strap 120 is slid into the storage compartment 32, pressure can be applied to forcibly position the projection 212a within the channel 104 to the second position with respect to the track 102b. As shown in FIG. 12B, following forcible positioning of the projection 212a within the channel 104 from the first position to the second position, the projection 212a is substantially pressure fit into the channel 104, and movement of the projection 212a towards the first position is inhibited. Although specific configurations of the track 102b and the projection 212a are shown and described, it will be understood that many variations in the sizes, shapes and/or configurations of the representative track 102b, projection 212a or both are possible to achieve a reduction in clearance between the channel 104 of the track 102b and the projection 212a at various of the possible positions of the projection 212a with respect to the track 102b.

While the invention has been described with reference to a number of non-limiting examples, it will be understood that considerable alternatives are possible with respect to the number of tracks, the number of projections, and the combinations by which one or more projections can be placed into mateable engagement with one or more tracks. Further, alternative configurations for the tracks and/or the projections may permit storage elements to be suspended from the overhead surface 46 at multiple positions and/or orientations, for example. The tracks can be applied either alternatively or additionally to other storage compartments than the storage structure 30, for example a storage compartment contained within the center console 24, such that the above described storage elements and items can optionally be stored in other parts of the vehicle.

It will also be understood that the components comprising the suspension assembly 90 may have configurations varying from those specifically illustrated and described. For instance, the tracks could be configured other than as a C-shaped members, and the projections could have other than a T-shaped cross sections. In another alternative example, the tracks could form a male member, with the projections defining a corresponding female channel.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A storage structure for a passenger vehicle defining a passenger compartment, comprising:
    a storage compartment configured for providing a storage space apart from the passenger compartment and defined at least in part by an overhead surface;
    a storage element positionable in the storage compartment; and
    a suspension assembly for suspending the storage element from the overhead surface, the assembly including a first portion on the overhead surface and a second portion connectable to the storage element and configured for selective mateable engagement with the first portion, wherein the engagement of the second portion with the first portion is permissive of rotation of the storage element with respect to the overhead surface about an upright axis.

2. The storage structure of claim 1, further comprising:
the first portion comprising a track; and
the second portion comprising a projection configured for slidable engagement with the track.

3. The storage structure of claim 2, further comprising:
the storage compartment having an opening for providing access to the storage compartment; and
the track extending along the overhead surface and having a receiving end accessible from the opening, wherein the projection is engageable with the track at the receiving end and slidably positionable at multiple positions with respect to the track.

4. The storage structure of claim 3, wherein a clearance between the track and the projection is configured to decrease as the projection is positioned from a first position with respect to the track to a second position with respect to the track further along the track from the receiving end than the first position.

5. The storage structure of claim 4, wherein the clearance between the track and the projection when the projection is positioned at the second position is configured such that movement of the projection along the track away from the first position and beyond the second position is inhibited following forcible positioning of the projection from the first position to the second position.

6. The storage structure of claim 2, wherein:
the track is a first track of a plurality of laterally spaced tracks on the overhead surface; and
the projection is configured for selective mateable engagement with the first track to suspend the storage element in a first position with respect to the overhead surface, and for selective mateable engagement with at least one other of the plurality of tracks to suspend the storage element in a second position with respect to the overhead surface.

7. The storage structure of claim 2, wherein the track defines a channel extending along the overhead surface, and the projection has a T-shaped cross section sized for receipt within the channel.

8. The storage structure of claim 1, wherein the storage element comprises a flexible strap configured to at least partially surround an item in order to retain the item within the storage compartment when the second portion of the assembly is matingly engaged with the first portion of the assembly.

9. A passenger vehicle, comprising:
a vehicle interior;
a storage compartment accessible from the interior and defined at least in part by an overhead surface; and
a suspension assembly for suspending a storage element positionable in the storage compartment from the overhead surface, the assembly including a track on the overhead surface, the track defining a channel extending along the overhead surface, and a projection connectable to the storage element and configured for selective mateable engagement with the track, the projection having a T-shaped cross section sized for receipt within the channel for slidable engagement with the track.

10. The storage structure of claim 9, further comprising:
the storage compartment having an opening for providing access to the storage compartment; and
the track having a receiving end accessible from the opening, wherein the projection is engageable with the track at the receiving end and slidably positionable at multiple positions with respect to the track.

11. The storage structure of claim 10, wherein a clearance between the track and the projection is configured to decrease as the projection is positioned from a first position with respect to the track to a second position with respect to the track further along the track from the receiving end than the first position.

12. The storage structure of claim 11, wherein the clearance between the track and the projection when the projection is positioned at the second position is configured such that movement of the projection away from the first position and beyond the second position is inhibited following forcible positioning of the projection from the first position to the second position.

13. The storage structure of claim 9, wherein:
the track is a first track of a plurality of laterally spaced tracks defining respective channels extending along the overhead surface; and
the projection is sized for receipt within the channel of the first track for selective mateable engagement with the first track to suspend the storage element in a first position with respect to the overhead surface, and for receipt within the channel of at least one other of the plurality of tracks for selective mateable engagement with the other track to suspend the storage element in a second position with respect to the overhead surface.

14. The storage structure of claim 9, further comprising:
a plurality of laterally spaced tracks defining respective channels extending along the overhead surface, the plurality of tracks including at least a first pair of tracks and a second pair of tracks; and
at least two projections each configured for slidable engagement with a track, the two projections sized for receipt within the channels of the first pair of tracks to suspend the storage element in a first position with respect to the overhead surface, and for receipt within the channels of the second pair of tracks to suspend the storage element in a second position with respect to the overhead surface.

15. The storage structure of claim 9, wherein the engagement of the projection with the track is permissive of rotation of the storage element with respect to the overhead surface.

16. A storage structure for a passenger vehicle defining a passenger compartment, comprising:
a storage compartment configured for providing a storage space apart from the passenger compartment and defined at least in part by an overhead surface;
a storage element positionable in the storage compartment; and
a suspension assembly for suspending the storage element from the overhead surface, the assembly including:
a plurality of laterally spaced linear tracks extending along the overhead surface, and
at least one projection connectable to the storage element and configured for selective mateable engagement with multiple of the plurality of tracks, wherein the projection is configured for selective engagement with at least a first of the plurality of tracks to suspend the storage element in a first position with respect to the overhead surface, and a second of the plurality of tracks to suspend the storage element in a second position with respect to the overhead surface, and wherein the projection is one of a linearly extending projection engageable with a respective track for translation along the track, and a head member engageable with a respective track for translation along the track and rotation within the track about an upright axis.

17. The storage structure of claim 16, wherein the plurality of tracks each define a channel extending along the overhead surface, and the at least one projection has a T-shaped cross section sized for receipt within the channels.

18. The storage structure of claim 16, wherein the storage element comprises a flexible strap configured to at least partially surround an item in order to retain the item within the storage compartment when the projection is matingly engaged with one of the plurality of tracks.

* * * * *